United States Patent Office 3,009,807
Patented Nov. 21, 1961

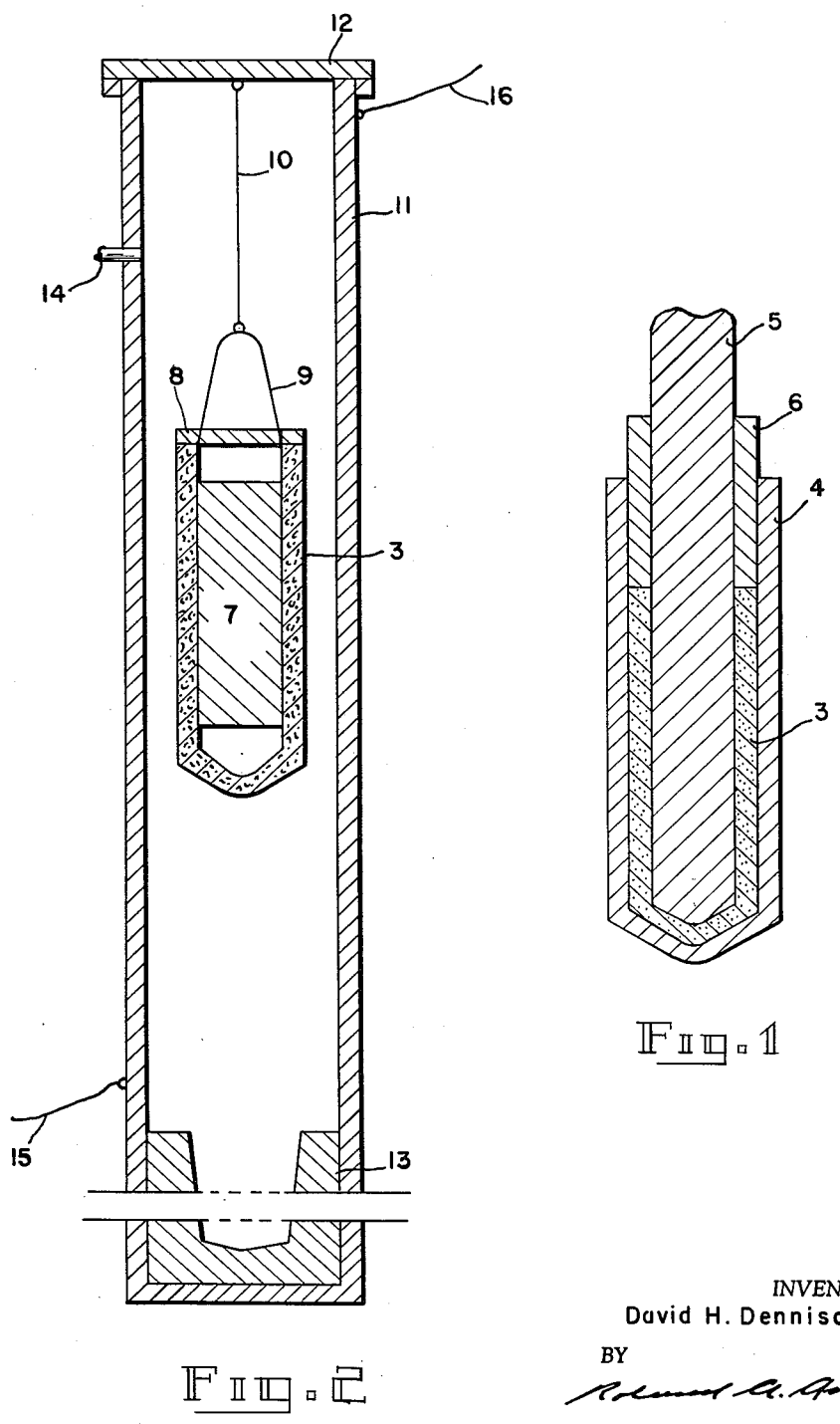

3,009,807
YTTRIUM DECONTAMINATION
David H. Dennison, Ames, Iowa, assignor to the United States of America as represented by the United States Atomic Energy Commission
Filed Oct. 28, 1959, Ser. No. 849,420
5 Claims. (Cl. 75—84)

The invention relates to a method and apparatus for decontaminating yttrium, particularly yttrium contaminated with tantalum.

The metal yttrium, formerly regarded as a scientific curiosity, has of recent years been produced in greater quantities for various uses, particularly in the nuclear energy field. Its low thermal neutron cross section of 1.4 barns combined with comparatively low density, good mechanical strength and corrosion resistance under many conditions make it useful in reactors as a structural metal either alone or in alloys with other metals.

In the production of yttrium tantalum crucibles and other containers are used at some stage of the process, and while the two metals were formerly considered insoluble, experience has shown that small amounts of tantalum become dissolved in yttrium, ranging from about 0.01 to about 0.1 atomic percent. This contamination is serious in nuclear applications, since tantalum has a thermal neutron cross section of about 21 barns, and can therefore affect the nuclear properties of the yttrium to an extent far out of proportion to the amount present.

Up until the present invention no really satisfactory method was known for removing this small amount of tantalum from yttrium. Yttrium and tantalum both have too high boiling points for distillation to be practicable, and its feasibility is further reduced by the fact that the lower boiling component, yttrium, is the one present in preponderant amount rather than the reverse. The only remaining known possibility was one of the methods of "wet chemistry," necessitating the complete dissolution of the metallic mass in some aqueous solvent such as nitric acid and then separating the two metals by some such procedure as solvent extraction or ion exchange. While these procedures might possibly yield a pure solution of yttrium, the problem remains of reducing it back to the metallic state, which is quite comparable to reducing it from the ore in the first place; in either case tantalum vessels must be used, or else some other kind of contamination must be risked if they are replaced by vessels made from other materials. Methods of this kind, therefore, result in placing yttrium in a condition where it is likely to be recontaminated in some manner if it is to be returned to the metallic state, so that nothing is really gained thereby.

It is an object of this invention to provide a method of decontaminating yttrium while in the metallic state.

It is a further object of the invention to provide a method of decontaminating yttrium from tantalum without resorting either to distillation or to wet chemical methods.

It is a further object to provide a method of decontaminating yttrium from tantalum which shall be more economical and less cumbersome than known methods.

All the foregoing objects are attained by my discovery that the small amounts of tantalum, ranging from about 0.01 to about 0.1 atom percent, usually found in yttrium as a result of contact with tantalum vessels, may be removed by filtration, by means of a filter of porous tungsten, and yet no detectable amount of tungsten will be found in the yttrium after the filtration.

In the drawings:
FIGURE 1 is a schematic illustration of the apparatus used for making a tungsten filter to be used in carrying out my invention; and FIGURE 2 is a similar illustration of the main apparatus used for carrying out my invention.

In carrying out my invention I make a filter by first reducing powdered tungstic oxide with hydrogen at about 900° C. so as to produce a tungsten powder of about 400 to 600 mesh. As shown in FIGURE 1, the tungsten powder 3 is placed in a tantalum mold which may be of any suitable shape, but preferably of the somewhat pointed closed cylindrical shape of mold 4 in FIGURE 1. The powder is then compacted by vibration; I prefer an arrangement such as a vibrating brass mandrel 5 and brass collar 6 shown in FIGURE 1, the vibration being continued until the powder 3 becomes compacted into the shape shown in FIGURE 1. The vibrating device such as the illustrated mandrel 5 and collar 6 are then withdrawn and the compacted tungsten powder is sintered in the mold 4 under a vacuum of about $5 \times 10^{-4}$ mm. Hg at a temperature of about 2200° C. for about ten minutes. The sintered tungsten is then removed from the mold 4 and the surface which has been next to the mold 4 is removed, as by grinding, to a depth sufficient to eliminate any tantalum or other mold material which may have diffused into the filter shape.

The filter 3 is now charged with a billet 7 of contaminated yttrium, and provided with tungsten lid 8 and tungsten wire hanger 9, and suspended by means of tantalum suspension wire 10 within tantalum tube 11. The tube is closed at the top by lid 12 and at the bottom by copper mold 13 which is cooled by water (not shown). The tube is then evacuated through outlet 14 by an evacuation means (not shown) to within the range of $2 \times 10^{-6}$ to $5 \times 10^{-7}$ mm. Hg, and the temperature is raised to about 1550° C. by passing an electric current from wires 15 and 16 through tube 11 which causes resistance heating. The heating is continued for a sufficient time for the yttrium to percolate through the filter 3 and collect and solidify in mold 13. It is not strictly necessary that this be complete, the heat may be removed sooner, causing a heel of solidified metal to form in the filter 3, but this will come through decontaminated on the next run of the apparatus.

Various theories have been suggested to account for this unexpected effect on the yttrium from the filtering through tungsten. One of these is that a compound is formed between the tungsten and the tantalum within the structure of the filter 3. Another explanation is that a novel thermodynamic effect is brought about by the presence of the three metals, resulting in a double suppression of solubilities, the first of the tantalum within the yttrium, and the second of the tungsten within the yttrium, whereby the yttrium percolates out of the filter 3 free of both metals. However, I have been unable rigorously to verify these or any of the other explanations offered for the phenomenon and therefore do not wish to be bound thereby; the invention is offered on the basis of the experimental findings which I have made such as those set forth in Table I which shows the atom percentages of tantalum and tungsten as determined spectrographically in three runs of yttrium metal before and after filtration according to the invention.

Table I

| Run No. | a/o Tantalum | | a/o Tungsten | |
|---|---|---|---|---|
| | Before Filtration | After Filtration | Before Filtration | After Filtration |
| 1 | 0.05 | Not detectable. | Not detectable. | Not detectable. |
| 2 | 0.01 | ----do------ | ----do------ | Do. |
| 3 | 0.1 | ----do------ | ----do------ | Do. |

Having now described my invention, I claim:

1. A method for decontaminating yttrium metal contaminated with dissolved tantalum comprising filtering the yttrium tantalum solution in the molten state through a porous mass of tungsten.

2. A method of removing tantalum dissolved in yttrium from about 0.01 atom percent to about 0.1 atom percent comprising filtering the yttrium through a porous mass of tungsten.

3. The method of claim 2 where the filtration is carried out at about 1550° C.

4. The method of claim 3 where the porous mass consists of sintered tungsten metal particles of about 400 to 600 mesh.

5. The method of claim 4 where the particles have been compacted prior to sintering by vibration.

References Cited in the file of this patent

UNITED STATES PATENTS

| | | |
|---|---|---|
| 1,541,778 | Agricola | June 16, 1925 |
| 1,710,398 | Bakken | Apr. 23, 1929 |
| 1,753,891 | Jones | Apr. 8, 1930 |
| 2,757,425 | Duncan et al. | Aug. 7, 1956 |
| 2,780,539 | Seiler | Feb. 5, 1957 |
| 2,797,159 | Lebedeff et al. | June 25, 1957 |
| 2,963,361 | Teitel | Dec. 2, 1960 |